(12) United States Patent
Gerhart

(10) Patent No.: US 7,298,170 B2
(45) Date of Patent: Nov. 20, 2007

(54) SAFETY SYSTEM BASED ON RECONFIGURABLE ARRAY OF LOGIC GATES

(75) Inventor: Paul B. Gerhart, North Wales, PA (US)

(73) Assignee: Honeywell International Inc., Morristown, NJ (US)

( * ) Notice: Subject to any disclaimer, the term of this patent is extended or adjusted under 35 U.S.C. 154(b) by 104 days.

(21) Appl. No.: 11/323,719

(22) Filed: Dec. 30, 2005

(65) Prior Publication Data

US 2007/0152709 A1    Jul. 5, 2007

(51) Int. Cl.
*H03K 19/173*    (2006.01)
(52) U.S. Cl. .......................................... 326/38; 700/79
(58) Field of Classification Search ............ 326/37–41; 700/79
See application file for complete search history.

(56) References Cited

U.S. PATENT DOCUMENTS

| | | | |
|---|---|---|---|
| 5,422,808 A * | 6/1995 | Catanese et al. ............... | 700/79 |
| 5,580,366 A | 12/1996 | Farkas | |
| 5,742,624 A * | 4/1998 | Irie et al. ..................... | 714/799 |
| 6,981,167 B2 * | 12/2005 | Johnson et al. ............. | 713/500 |
| 2005/0251638 A1 * | 11/2005 | Boutaud et al. ............ | 711/167 |
| 2006/0219299 A1 * | 10/2006 | Snowbarger ............. | 137/487.5 |

FOREIGN PATENT DOCUMENTS

| WO | WO 03/052795 A2 | 6/2003 |
|---|---|---|
| WO | WO 2005/101142 A1 | 10/2005 |

* cited by examiner

*Primary Examiner*—Don Le
(74) *Attorney, Agent, or Firm*—Scully, Scott, Murphy & Presser PC

(57) ABSTRACT

An array of logic gates is configured to implement a predefined strategy for an emergency response system in a hardware-only runtime environment. The array of logic gates receives a plurality of input signals from a set of sensors and actuators located within an industrial processing system. Based upon the received plurality of input signals, the array of logic gates determines an emergency response using the predefined strategy. The array of logic gates implements the emergency response to control the industrial processing system based upon the predefined strategy. The array of logic gates can be reconfigured based upon a change in the predefined strategy.

6 Claims, 2 Drawing Sheets

SAFETY SYSTEM BASED ON RECONFIGURABLE ARRAY OF LOGIC GATES

BACKGROUND OF THE INVENTION

1. Field of Invention

The invention relates to an emergency shutdown system, and more particularly to a logic circuit that is reconfigurable to execute an emergency response using a predefined user strategy.

2. Description of Related Art

All emergency shutdown systems are governed by a certification standard, IEC 61508, which outlines the requirements for both software and hardware used to implement an emergency shutdown system. IEC 61508 is directed to the functional safety of electrical/electronic/programmable electronic safety related systems.

IEC 61508 governs all aspects of the emergency shutdown system from conception, design, implementation, operation and maintenance. Specifically, the standard provides a method for the development of safety requirements necessary to achieve the required functional safety for the system. The main concern for the safety standard is a system failure that could have an impact on the safety of persons or the environment.

The purpose of the emergency shutdown system is to reduce hazard and risk potentials with the operation of electronic, hydraulic, and electric devices.

Typically, an emergency shutdown system is implemented by a computer-based system. This computer-based system requires certification for both the software and hardware elements of the emergency shutdown system as well as any other software the runs on the computer; additionally any changes to either the software or hardware elements. Certification is also required for the process of creating hardware and software.

The certification process is designed to reduce the number of failures in the emergency shutdown system caused by random hardware, software, or integration failures.

The certification process is time consuming and requires a significant amount of overhead, especially where both the software and the hardware must be certified. It is particularly difficult to achieve a certification in systems that include significant software components, as there are numerous requirements for the software.

Accordingly, there is a need to provide an emergency shutdown system that complies with the IEC 61508 that can be certified in a quick and efficient manner.

BRIEF SUMMARY OF THE INVENTION

Applicant has developed a hardware-only runtime emergency response system that eliminates the need for any runtime software.

Accordingly, disclosed is an array of logic gates configured to implement a predefined strategy for an emergency response system in a hardware-only runtime environment. The array of logic gates comprises a means for receiving a plurality of input signals from a set of sensors and actuators located within an industrial processing system, means for determining an emergency response based upon the received plurality of input signals using the predefined strategy, and means for implementing the emergency response. The emergency response is determined by the predefined strategy and controls the industrial processing system.

The array of logic gates can be a field programmable gate array (FPGA). A subset of the array of logic gates is grouped and connected together to act as Boolean, sequential and combinational logic. This grouping is determined by the predefined strategy. An initial grouping occurs prior to installation. The configuration process, which causes the gates to be grouped, is performed using a special configuration tool. The array of logic gates can be easily reconfigured when there is a change in the predefined strategy. This allows for the emergency response system to be able to easily adjust to new machines within the factory, or a new safety strategy.

The array of logic gates can be connected with at least a second distinct set of array of logic gates, in parallel, to create a redundant emergency response system. At least a second distinct set of array of logic gates will be configured to be identical to the original array of logic gates. The outputs from each of said connected sets of arrays of logic gates will be compared with each other to confirm that the outputs are the same, and if said outputs are not the same, said emergency response system causes the industrial processing system to be shutdown.

The emergency response system is certifiable with fewer items needing proof of compliance.

BRIEF DESCRIPTION OF THE DRAWINGS

These and other features, benefits, and advantages of the present invention will become apparent by reference to the following text and figures, with like reference numbers referring to like elements across the views, wherein.

DETAILED DESCRIPTION

According to one embodiment of the invention, the response system includes a programmable logic device. The programmable logic device includes a group of logic gates or blocks, i.e., an array of gates that can be configured to provide the functionality for a specific user's defined safety strategy. The programmable logic device can be any device that includes a group of logic gates, such as a programmable logic array (PLA), a programmable array logic device (PAL), and a field programmable gate array (FGPA). A FGPA is a device that contains a plurality of logic blocks and a plurality of interconnections between the logic blocks. Each logic block and interconnection can be programmed to duplicate the functionality of basic logic gates, or more complex functions such as a decoder, multiplex, or complete mathematical functions. Logic block and interconnection allows the gates to be interconnected by the user to implement a plurality of functions. Additionally, this structure allows the user to re-configure the interconnections to implement different functions.

Figure 1:
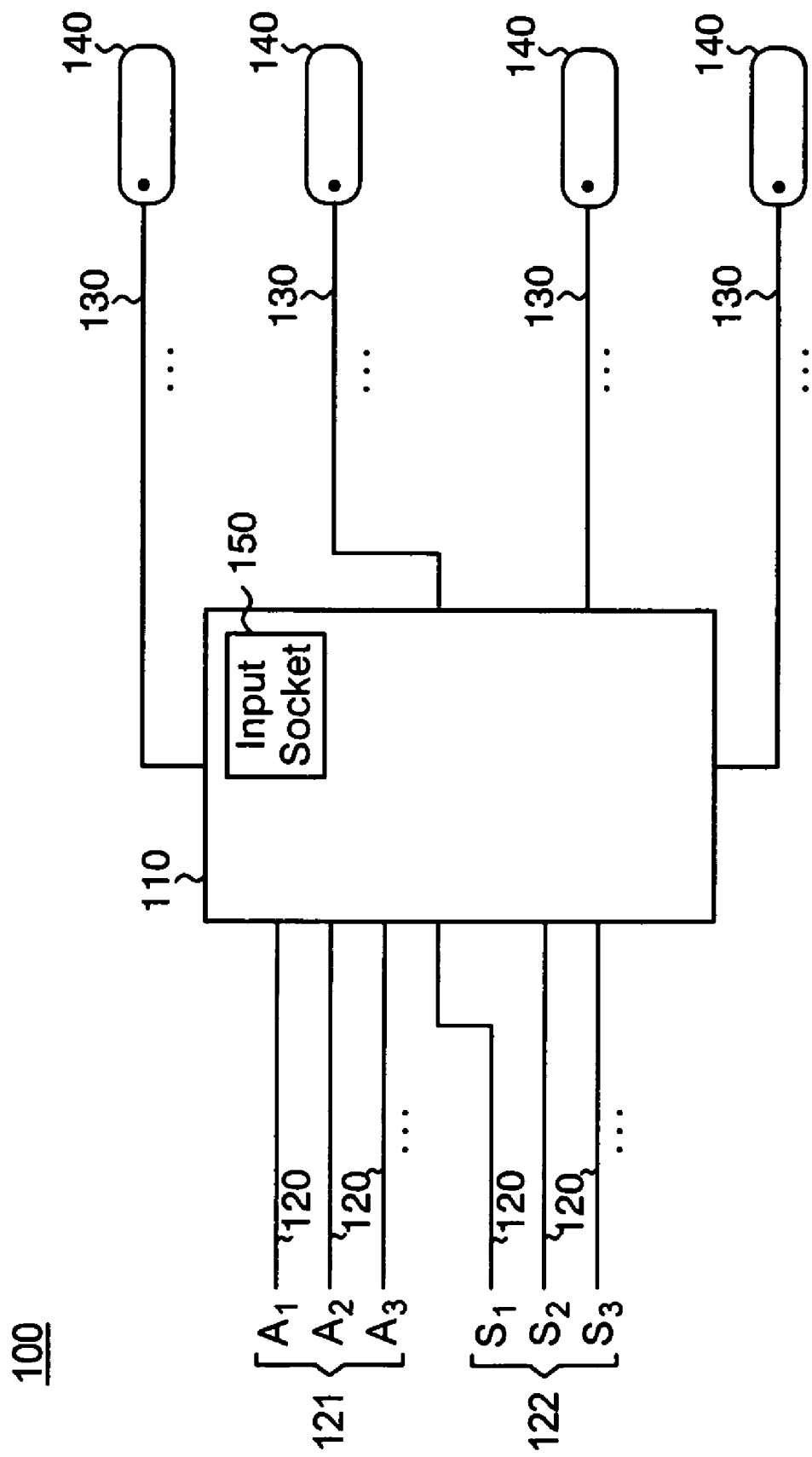
FIG. 1 illustrates a hardware based emergency response system according to the first embodiment of the invention.

FIG. 1 illustrates an emergency response system according to one embodiment of the invention. The emergency response system 100 includes an array of logic gates 110, a plurality of input signals 120, and a plurality of output signals 130. The plurality of input signals is generated by a set of actuators 121 and sensors 122 in communication with the array of logic gates 110. The sensors 122 and actuators 121 can be physically connected with the array of logic gates 110 or connected via a communications network. The sensors 122 detect various properties of the industrial processing system, such as, but not limited to, temperature, pressure, smoke, time, motion, pressure, and radiation. The input value can be reduced to a bit signal such as high or low, i.e., presence or absence of an event, or a specific value detected by the sensor, i.e., greater than or lesser than a predetermined threshold value. Additionally, the input value can be a multi-bit value such as an integer. The output signals 130 are generated based upon the Boolean, sequential, or combinational logic function of the array of logic gate 110. Each output signal 130 is used to drive an emergency response 140.

The emergency response system 100 will include a means for configuring (not shown) the array of logic gates 110 to perform a predefined user safety strategy. The means for configuring the array of logic gates 110 can be a hardware description language tool or a schematic design tool, or electronic design automation tools. For example, common hardware description language tools are VHDL and verilog.

Specifically, the array of logic gates 110 will be configured using one of the electronic design automation tools. The electronic design automation tool will generate a mapped netlist that can be fitted to the actual array of logic gates using a place-and-route process. The user will validate the map, place and route results using various verification processes, e.g., timing analysis, simulation, and repetition. Once the design and validation process is complete, the file will be uploaded to the array of logic gates 110 to configure the device, via at least one input socket 150. This configuration will occur prior to any operation as the emergency response system 100 operates in a hardware-only runtime environment.

The predefined user safety strategy will be based on the specific industrial processing system that is controlled by the emergency response system 100. Specifically, the predefined user safety strategy is used to create a grouping or subset of logic gates to define a set of Boolean, sequential, or combinational logic functions from the subset that the emergency response system 100 executes to implement a proper emergency response 140 to a given set of sensor and actuator inputs 120 and 130. A proper emergency response 140 can include shutdown, removing power, generating an alarm, and causing the fire sprinkler system to activate. The emergency response 140 will be based upon one or more of the output signals 130 generated by the array of logic gates 110.

The predefined strategy is dependent on the process system, the types of industrial manufacturing machines, and the manufactured product. For example, there would be a different predefined strategy for a papermaking machine and an aluminum manufacturing system.

For example, in an industrial process there may be a vessel to accept feedstock fluids, heat them, and empty the vessel. This process would require several conditions to be monitored: the supply of feed stocks via levels in a tank; temperature in the vessel via thermocouple devices; fuel for the heating element via pressure of a gas line; outlet valve health and the level in the next tank in the processing system. The user would develop a predefined strategy that would test each of the measured conditions for correctness, i.e., within a range of expected value. Specifically, the user would develop logic functions to test each value and each case. If one or more of the values were incorrect, i.e., out of range, the predefined strategy could be designed to remove heat from the vessel, vent any pressure and/or move the fluid to a reserved area for later disposition. The array of logic gates would then be configured with the predefined strategy and run continuously. The logic gates would be grouped to implement the testing of measurement and the sequencing of any actions based on the measurements. The action could also include generating an alarm to a sound/light device.

Additionally, the emergency response system 100 might include an interlock or reset switch such that if an operator has not reset the switch, fluid would not be added until the switch is set to a normal position, i.e., reset.

The emergency response system 100 can also include a means to stamp the time-of-day that a response was generated so that the sequence of events that led to the response is known.

Once the array of logic gates 110 are configured, only the functional aspects of the array of logic gates 110 and the predefined user safety strategy needs to be certified, since there is no runtime software or operating system for a "data processor" embedded in the system. Thus, an advantage of the present invention is that the emergency response system exhibits a reduced set of objects that need to be certified. For example, IEC 61508 provides specific requirements for software architecture, the interaction between E/E/PE hardware and software, and the selection a suitable set of tools, including language and compliers for the required safety integrity level. In practice, a certifying agency is particular focused on the operating system in use, how the software executes instructions and how data is processed or moves around within the system. This invention eliminates an "operating system" according to the classic definition, simplifies the execution of instructions by using groups of logic gates and simplifies the movement of data by only moving data between the various groups of logic gates Another advantage of the present invention is that since the array of logic gates 110 can be re-configured, the emergency response system 100 can be easily updated or changed to reflect any change in the sensors 122 or actuators 121 or any newly identified safety procedures. This change in the emergency response system 100 would be engendered by a modification to the interconnections between the logic gates and grouping of the array of logic gates caused by the change in the Boolean, sequential, or combinational logic function, as determined by the modification to the pre-defined strategy. Additionally, only the new function would have to be re-certified when the array of logic gates 110 is re-configured.

Figure 2:
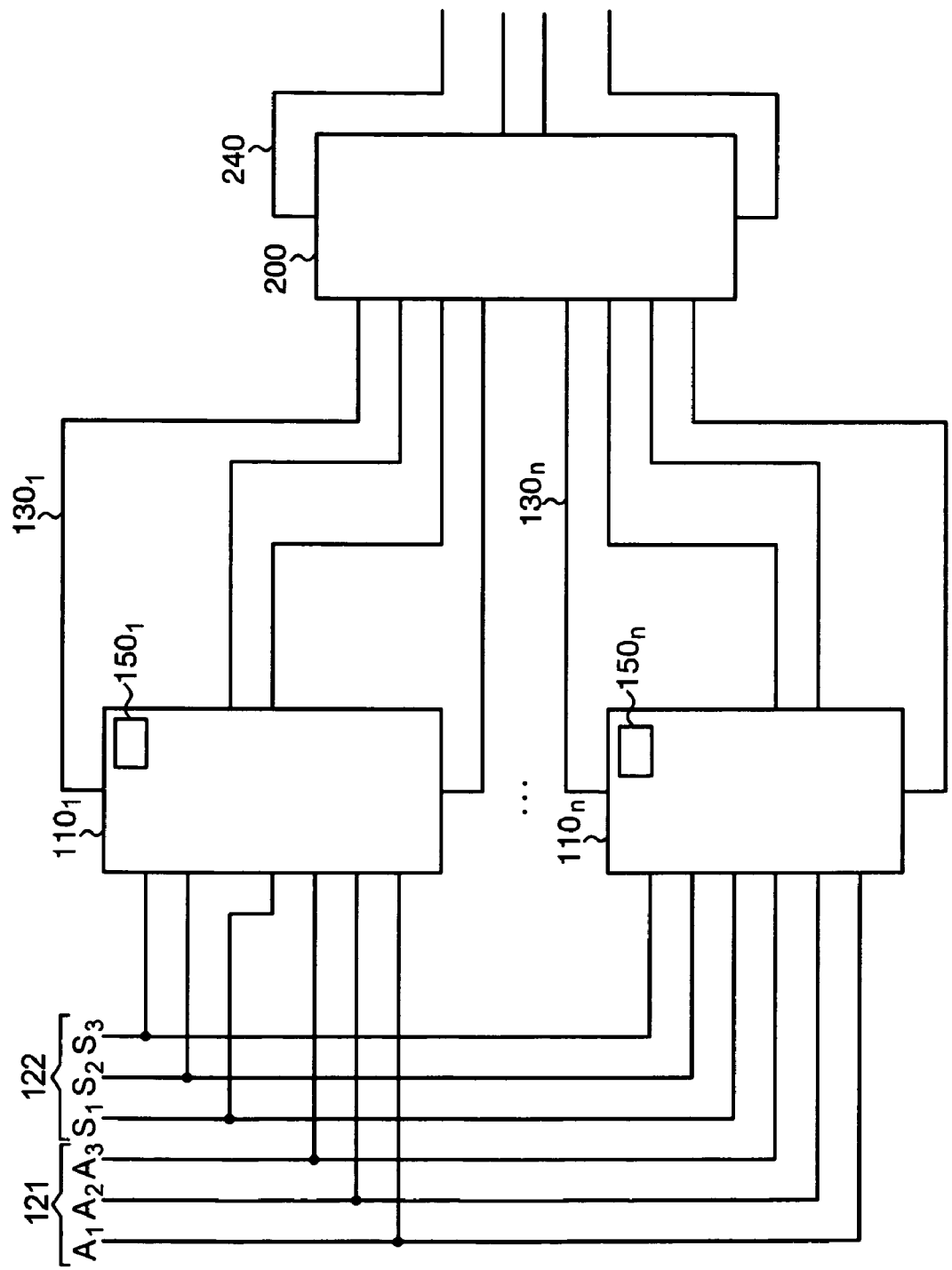
FIG. 2 illustrates another embodiment of the emergency response system according to the invention.

In another embodiment of the invention, at least two sets of arrays of logic gates $110_{1-n}$ are used in parallel to implement the emergency response system. FIG. 2 illustrates the emergency response system according to this embodiment. Each set of array of logic gates $110_{1-n}$ is configured to have the identical Boolean, sequential or combinational logic functions, same gate connections and same interconnections using its input socket $150_{1-N}$. Each set of array of logic gates $110_{1-n}$ further has the same input signals as the actuators 121 and sensors 122.

The duplicated gate configuration in each set is used for redundancy purposes to assure that the emergency response system 100 functions properly. Specifically, each set of array of logic gates $110_{1-n}$ should produce the identical output values $130_{1-n}$ as each other set of array of logic gates, given that each set of array of logic gates $110_{1-n}$ has the identical input value and configuration. Therefore, if the output values $130_{1-n}$ of each set of array of logic gates $110_{1-n}$ are different, then at least one of the sets of array of logic gates is malfunctioning. A malfunction is determined by a comparison of each set of output values $130_{1-N}$. Each set of output values $130_{1-N}$ is fed to a comparator 200 for comparison. If the set of output signals do not match, then at least one of the each set of array of logic gates is malfunctioned. This is determined from the output of the comparator 240. The emergency response system can shutdown the industrial processing system in response to this malfunction. The comparator 200 can be any type of comparison device. Alternatively, the comparator 200 can be a simple XOR gate.

In another embodiment, the emergency response system 100 includes an array of logic gates 110 that can also control or actuate another element of the industrial processing system that does not have a safety response function such as a process control. For example, the state of the array of logic gates 110 can be used to control a set of actuators 121. A separate and distinct process control system can check the state of the safety system prior to controlling the process. The process control system will determine if the emergency response system has initiated an emergency response and if there is an emergency response, the process control system will not execute the function. For example, if the emergency response system has shutdown a portion of a plant tat uses heated fluid, the process control system will not start the heating of a vessel full of the fluid. In this case, the outputs of the emergency response system are also fedback as inputs to the process control system.

The above description and drawings are given to illustrate and provide examples of various aspects of the invention, and is not intended to limit the invention to the examples or illustrations. Given the benefit of the above disclosure, those skilled in the art may be able to devise various modifications and alternate constructions that, although differing from the examples disclosed herein, nevertheless enjoy the benefits of the invention and fall within the scope of the invention.

The invention claimed is:

1. An array of logic gates configured to implement a predefined strategy for an emergency response system in a hardware-only runtime environment, said array of logic gates comprising:
   (a) means for receiving a plurality of input signals from a set of sensors and actuators located within an industrial processing system;
   (b) means for determining an emergency response based upon the received plurality of input signals using the predefined strategy; and
   (c) means for implementing the emergency response, as determined by the predefined strategy, to control the industrial processing system,
   wherein the array of logic gates is a field programmable gate array (FPGA) and said FPGA is connected with at least another FPGA that is configured to implement the same predefined strategy, in parallel, to create a redundant emergency response system.

2. The array of logic gates of claim 1, wherein said configuring causes a subset of the array of logic gates to be grouped and connected to act as Boolean, sequential or combinational logic functions, as determined by the predefined strategy.

3. The array of logic gates of claim 1, wherein said array of logic gates is reconfigured when there is a change in the predefined strategy.

4. The array of logic gates of claim 1, wherein outputs from the array of logic gates is fedback to a separate process control system and are used as a control signal for the process control system to implement process control for the industrial processing system.

5. The array of logic gates of claim 1, where outputs from each of said connected FPGAs are compared with each other to confirm that the outputs are the same, and if said outputs are not the same, said emergency response system causes the industrial processing system to be shutdown.

6. A method of providing a certifiable emergency response system comprising the steps of:
   (a) developing a predefined strategy for implementing an emergency response system, said predefined strategy includes instructions for generating at least one emergency response based upon signals received from a plurality of input sensors and actuators located within an industrial processing system;
   (b) configuring an array of logic gates to implement the predefined strategy for the emergency response system in a hardware-only runtime environment,
   (c) configuring at least one other array of logic gates to implement the predefined strategy for the emergency response system; and
   (d) connecting the configured array of logic gates with the at least one other configured array of logic gates, in parallel, to create a redundant emergency response system,
wherein said emergency response system is certifiable with fewer items needing proof of compliance.

* * * * *